US012675274B2

(12) United States Patent
Verma et al.

(10) Patent No.: US 12,675,274 B2
(45) Date of Patent: Jul. 7, 2026

(54) UPDATING A CLOUD SERVICE WITH FARMS GROUPED FOR A SAME UPDATE DEPLOYMENT STAGE

(71) Applicant: Microsoft Technology Licensing, LLC, Redmond, WA (US)

(72) Inventors: Nidhi Verma, Bellevue, WA (US); Rahul Nigam, Bothell, WA (US); Biranchi Narayan Panda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 18/323,959

(22) Filed: May 25, 2023

(65) Prior Publication Data

US 2024/0394035 A1 Nov. 28, 2024

(51) Int. Cl.
*G06F 9/44* (2018.01)
*G06F 8/65* (2018.01)
(52) U.S. Cl.
CPC ..................................... *G06F 8/65* (2013.01)
(58) Field of Classification Search
None
See application file for complete search history.

(56) References Cited

U.S. PATENT DOCUMENTS 7,149,789 B2 12/2006 Slivka et al.
8,296,267 B2 * 10/2012 Cahill ................. G06F 16/2329
707/661

9,442,715 B2 9/2016 Zhang et al.
9,552,366 B2 1/2017 Suryanarayanan et al.
10,185,549 B2 1/2019 Simek et al.
10,200,446 B2 2/2019 Hui et al.
10,572,240 B2 2/2020 Shantharam et al.
10,649,765 B2 5/2020 Kludy
10,673,955 B2 6/2020 Fransazov et al.
10,691,445 B2 6/2020 Garg et al.
(Continued)

FOREIGN PATENT DOCUMENTS

GB 2554069 A 3/2018
TR 2022019009 A2 1/2023

OTHER PUBLICATIONS

Illias Spiros, "What are DLLs and What are they used for", Apr. 2019, https://www.mvps.net/docs/what-are-dlls-and-what-are-they-used-for/ (Year: 2019).*

(Continued)

*Primary Examiner* — Lanny N Ung
(74) *Attorney, Agent, or Firm* — Han Gim; Newport IP, LLC

(57) ABSTRACT

An orchestrator for updating a cloud service includes: an orchestrator service host computer comprising a processor and memory; an orchestrator service for execution by the orchestrator service host computer for orchestrating updates to farms of the cloud service over a service bus; a stage management service for determining which farms should be in each stage of an update deployed by the orchestrator service; and a grouping table identifying farms that should be in a common stage of the update deployed by the orchestrator service. The stage management service places farms grouped in the grouping table in a common stage of the update deployment.

17 Claims, 11 Drawing Sheets

(56) References Cited

U.S. PATENT DOCUMENTS

| | | | |
|---|---|---|---|
| 10,915,379 | B1 | 2/2021 | Verma et al. |
| 11,138,646 | B2 | 10/2021 | Bermudez et al. |
| 11,144,365 | B1 | 10/2021 | Gordon et al. |
| 11,150,783 | B1 | 10/2021 | Kim |
| 11,372,634 | B1 | 6/2022 | Gabrielson et al. |
| 11,470,182 | B1 | 10/2022 | Virtser et al. |
| 11,487,900 | B2 | 11/2022 | Obembe et al. |
| 11,570,183 | B2 | 1/2023 | Mangayil et al. |
| 11,599,837 | B2 | 3/2023 | Krishnaswamy et al. |
| 11,829,743 | B2 | 11/2023 | Verma et al. |
| 2010/0327052 | A1* | 12/2010 | Iwakawa ............... G01K 1/024 |
| | | | 374/E1.001 |
| 2012/0102480 | A1 | 4/2012 | Hopmann et al. |
| 2012/0212321 | A1 | 8/2012 | Keener et al. |
| 2017/0017478 | A1 | 1/2017 | Briggs et al. |
| 2017/0132123 | A1 | 5/2017 | Ditullio et al. |
| 2017/0180487 | A1 | 6/2017 | Frank et al. |
| 2017/0192772 | A1 | 7/2017 | Islam et al. |
| 2017/0371639 | A1* | 12/2017 | Simek ..................... H04L 67/53 |
| 2018/0097694 | A1* | 4/2018 | Raz ......................... H04L 67/10 |
| 2018/0103084 | A1* | 4/2018 | Auvenshine ........ G06F 16/2246 |
| 2018/0136960 | A1* | 5/2018 | Zhang ................... G06F 9/4856 |
| 2018/0203684 | A1 | 7/2018 | Shuvali et al. |
| 2018/0322038 | A1 | 11/2018 | Thazhathekalam et al. |
| 2018/0365131 | A1 | 12/2018 | Armitage |
| 2019/0097825 | A1 | 3/2019 | Kan et al. |
| 2019/0196805 | A1 | 6/2019 | Lee et al. |
| 2020/0019393 | A1 | 1/2020 | Vichare et al. |
| 2020/0019400 | A1 | 1/2020 | Zhao et al. |
| 2020/0104122 | A1 | 4/2020 | Pechacek et al. |
| 2020/0287793 | A1 | 9/2020 | Buck et al. |
| 2020/0379744 | A1 | 12/2020 | Bhupati et al. |
| 2020/0403855 | A1 | 12/2020 | Sarood et al. |
| 2021/0117172 | A1 | 4/2021 | Gopinathan Nair et al. |
| 2022/0083365 | A1 | 3/2022 | Farret |
| 2022/0207448 | A1 | 6/2022 | Krishnaswamy et al. |
| 2022/0222273 | A1 | 7/2022 | Holmes-higgin et al. |
| 2022/0366340 | A1 | 11/2022 | Chen et al. |
| 2023/0096143 | A1 | 3/2023 | Kirmse |
| 2023/0106021 | A1 | 4/2023 | Verma et al. |
| 2024/0012632 | A1* | 1/2024 | Deshmukh ................ G06F 8/71 |

OTHER PUBLICATIONS

"Notice of Allowance Issued in U.S. Appl. No. 17/488,688", Mailed Date: Jun. 13, 2023, 6 Pages.

"Final Office Action Issued in U.S. Appl. No. 17/137,589", Mailed Date: Aug. 10, 2022, 14 Pages.

"Non Final Office Action Issued in U.S. Appl. No. 17/137,589", Mailed Date: Mar. 30, 2022, 17 Pages.

"Notice of Allowance Issued in U.S. Appl. No. 17/137,589", Mailed Date: Nov. 17, 2022, 7 Pages.

"Non Final Office Action Issued in U.S. Appl. No. 17/488,688", Mailed Date: Feb. 22, 2023, 16 Pages.

Cunningham, Paul, "The Debate Over Enabling New Office 365 Features by Default", Retrieved from: https://practical365.com/blog/debate-enabling-new-office-365-features-default/, Mar. 30, 2017, 12 Pages.

Deb, et al., "Under the Hood of Uber's Experimentation Platform", Retrieved from: https://eng.uber.com/xp/, Aug. 28, 2018, 18 Pages.

Holtzman, et al., "Opt in to Early Access Updates", Retrieved from: https://docs.microsoft.com/en-us/power-platform/admin/opt-in-early-access-updates, Sep. 8, 2020, 12 Pages.

Jiang, et al., "Why Tenant-Randomized A/B Test is Challenging and Tenant-Pairing May Not Work", Retrieved from: https://www.microsoft.com/en-us/research/group/experimentation-platform-exp/articles/why-tenant-randomized-a-b-test-is-challenging-and-tenant-pairing-may-not-work/, Nov. 4, 2020, 8 Pages.

Khemissa, et al., "Recommendations for IoT Firmware Update Processes", Retrieved From: https://downloads.cloudsecurityalliance.org/assets/research/internet-of-things/recommendations-for-iot-firmware-update-processes.pdf, Sep. 2018, 12 Pages.

Kirk, Elliot, "Controlled Feature Roll-outs in Microsoft Edge", Retrieved from: https://techcommunity.microsoft.com/t5/articles/controlled-feature-roll-outs-in-microsoft-edge/m-p/763678/highlight/true#M1358, Jul. 18, 2019, 11 Pages.

Liu, et al., "Enterprise-Level Controlled Experiments at Scale: Challenges and Solutions", In Proceedings of Euromicro Conference on Software Engineering and Advanced Applications, Aug. 28, 2019, 10 Pages.

Ouyang, et al., "Delayed Switch: Cloud Service Upgrade with Low Availability and Capacity Loss", In Proceedings of 5th International Conference on Software Engineering and Service Science, Jun. 27, 2014, pp. 1158-1161.

"International Search Report and Written Opinion Issued in PCT Application No. PCT/US21/058027", Mailed Date: Feb. 10, 2022, 11 Pages.

"International Search Report and Written Opinion Issued in PCT Patent Application No. PCT/US22/040015", Mailed Date: Nov. 3, 2022, 15 Pages.

Saveski, et al., "Detecting Network Effects: Randomizing Over Randomized Experiments", In Proceedings of International Conference on Knowledge Discovery and Data Mining, Aug. 13, 2017, 9 Pages.

Xia, et al., "Safe Velocity: A Practical Guide to Software Deployment at Scale using Controlled Rollout", In Proceedings of 41st International Conference on Software Engineering: Software Engineering in Practice, May 25, 2019, pp. 11-20.

Zhao, et al., "Safely and Quickly Deploying New Features with a Staged Rollout Framework Using Sequential Test and Adaptive Experimental Design", In Repository of arXiv:1905.10493v1, May 25, 2019, 12 Pages.

International Search Report and Written Opinion received for PCT Application No. PCT/US2024/028224, Jul. 9, 2024, 13 pages.

"Multi-cloud Database Management: Architectures, Use Cases, and Best Practices", Retrieved from: https://cloud.google.com/architecture/multi-cloud-database-management, Oct. 28, 2022, 34 Pages.

Fisher, Jenniferd. , "VMware Taps Partners to Scale Customer Success Effort", Retrieved From: https://deloitte.wsj.com/articles/vmware-taps-partners-to-scale-customer-success-effort-01647025494, Mar. 11, 2022, 8 Pages.

International Preliminary Report on Patentability (Chapter I) received for PCT Application No. PCT/US2024/028224, mailed on Dec. 4, 2025, 08 pages.

Communication pursuant to Article 94(3) EPC, Received for European Application No. 22773346.6, mailed on Aug. 27, 2025, 5 pages.

* cited by examiner

FIG. 1

UPDATING A CLOUD SERVICE WITH FARMS GROUPED FOR A SAME UPDATE DEPLOYMENT STAGE

BACKGROUND

Cloud-based services are services that are provided to users over a computer network, such as the Internet or a Local Area Network (LAN). Cloud-based services may include a vast range of different services for customers. These services may include, but are not limited to, applications for creating, consuming, and/or modifying content, file storage and management platforms, collaboration and communications platforms, and other types of software as a service (SaaS).

The architecture of a typical cloud-based service includes numerous servers, network devices, and storage elements to support the services provided. These devices include software, data, and configuration files that need to be updated periodically to add new features or to implement fixes to software or to the configuration. Additionally, some services may support agent software installed on respective client devices. This software may also need to be updated to a newer version to support added features and/or to fix problems associated with the current version.

However, issues may arise when an update to a cloud service is being deployed, particularly if the cloud services is provided over a larger network. For example, customers with employees located in different regions around the globe may experience an update to a cloud service that occurs over days, weeks or even longer. Consequently, at various times during the deployment of that software update, there will be some employees using the updated version and some still using the previous version. This leads to an inconsistent experience for tenants on different versions of the service and may also raise security concerns.

SUMMARY

In one aspect, the present disclosure describes: An orchestrator for updating a cloud service includes: an orchestrator service host computer comprising a processor and memory; an orchestrator service for execution by the orchestrator service host computer for orchestrating updates to farms of the cloud service over a service bus; a stage management service for determining which farms should be in each stage of an update deployed by the orchestrator service; and a grouping table identifying farms that should be in a common stage of the update deployed by the orchestrator service. The stage management service places farms grouped in the grouping table in a common stage of the update deployment.

In another aspect, the present disclosure describes: A method of deploying updates for a cloud service that is supported by a population of farms, the update being deployed in a series of stages that successively include a larger percentage of a userbase. The method includes: identifying a customer of the cloud service with tenants of the cloud service in different regions such that the tenants are at risk of being placed in different stages of the update deployment resulting in a potential difference in cloud service version for different parts of the customer; for the identified customer, determining which farms of the cloud service should be in a single stage of the update deployment to avoid the potential difference in cloud service version for different parts of the customer; generating a grouping table identifying the farms that should be in the single stage of the update deployment; and overriding other considerations, based on the grouping table, to place the identified farm, as grouped in the grouping table, in a common stage of the update deployment.

In another aspect, the present disclosure describes: A processing system that includes: a processor; a network interface to a service bus in communication with a population of farms supporting a cloud service; a memory storing executable instructions which, when executed by the processor, cause the processor, alone or in combination with other processors, to implement a cloud service update orchestration service, the orchestration service comprising a database of payload stage sequence overrides for when farms are being allocated to a stage of an update deployment; and a management control plane service to update the overrides based on an update service client dynamic link library, the overrides protecting a group of farms from being allocated to different stages of the update deployment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1 is a diagram showing an example computing environment in which techniques for providing a more consistent user experience across a particular customer are included.

DETAILED DESCRIPTION

Figure 2:
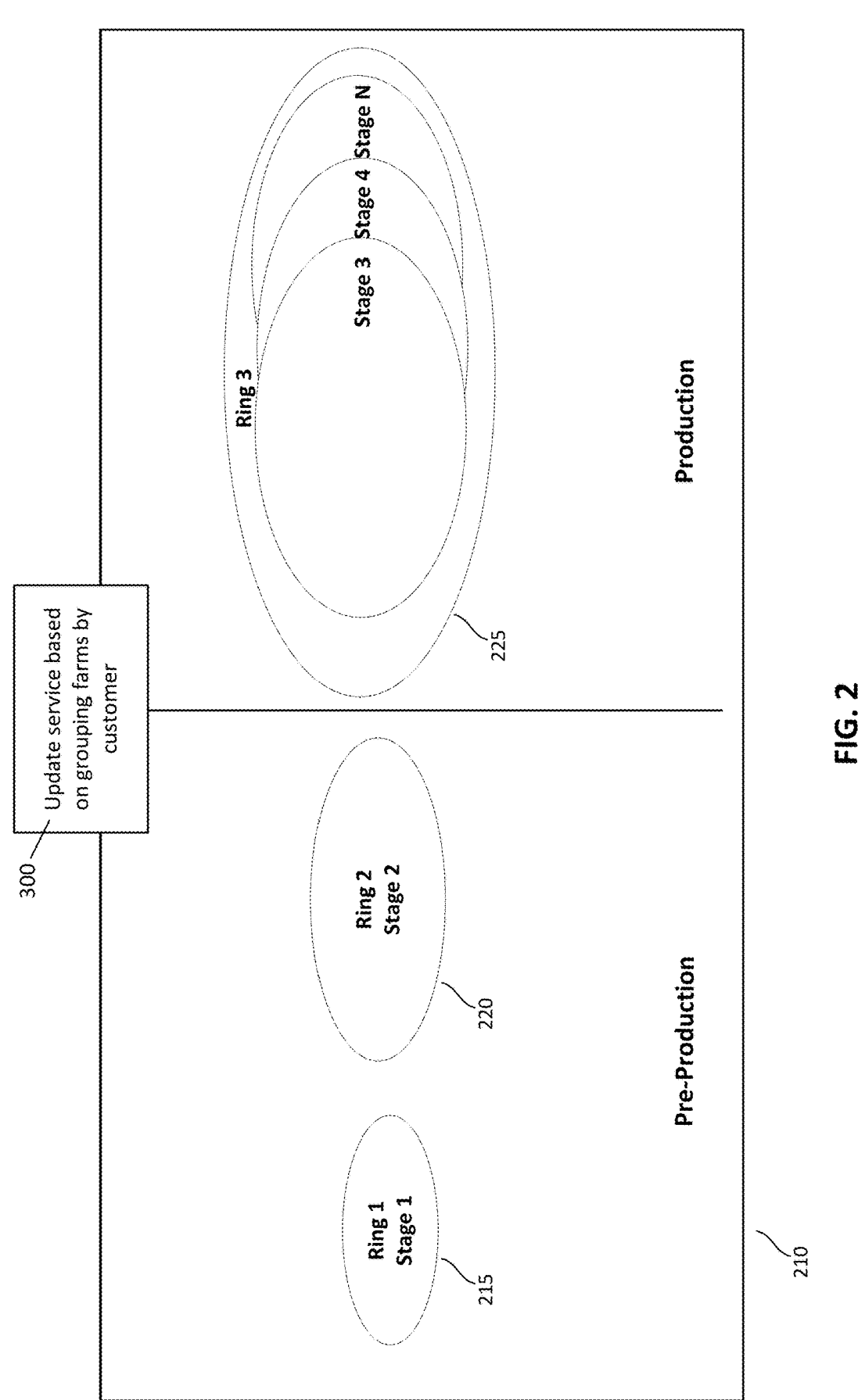
FIG. 2 is a diagram showing the example update service of FIG. 1 in a graduated update deployment approach including rings and stages of deployment within a userbase.

As noted above, a cloud service may be regularly updated, for example, to add new features, improve function, or fix bugs or other errors. However, issues may arise when an update to a cloud service is being deployed, particularly if the cloud services is provided over a larger network. For example, customers with employees located in different regions around the globe may experience an update to a cloud service that occurs over days, weeks or even longer. Consequently, at various times during the deployment of that software update, there will be some employees using the updated version and some still using the previous version. This leads to an inconsistent experience for users on different versions of the service and may also raise security concerns.

Inconsistencies tend to occur because updates are typically rolled out in multiple stages to different groups of users. This can mitigate the risk that unintended negative side effects of the update can cause widespread issues for customers. However, a staged rollout can also lead to an inconsistent user experience noted above as different users receive an update at different times, perhaps by as much as weeks or months.

The graduated approach to a cloud service update is referred to as ring deployment in which the deployment process is represented by an expanding series of rings. Each ring includes deploying the update to a larger subset of the userbase. Thus, for each successive ring, the software and/or configuration that support a corresponding subset of the userbase is updated. Each ring may also be further subdivided into a number of stages, each representing a subset of the userbase of that ring. The update may be sequentially applied to each stage within the ring, just as each ring sequentially receives the update. In this way, if problems are encountered, the problems can be limited to a subset of the userbase rather than potentially affecting the entire userbase. User feedback and telemetry data may be collected from users associated with each stage or ring to determine whether the new version of the software is operating correctly before deploying the updates to the next stage or ring. This process may continue until the update is deployed across the entire userbase. In an update rollout on a global scale, the stages may be sequenced geographically, such as by time zones.

Figure 1:
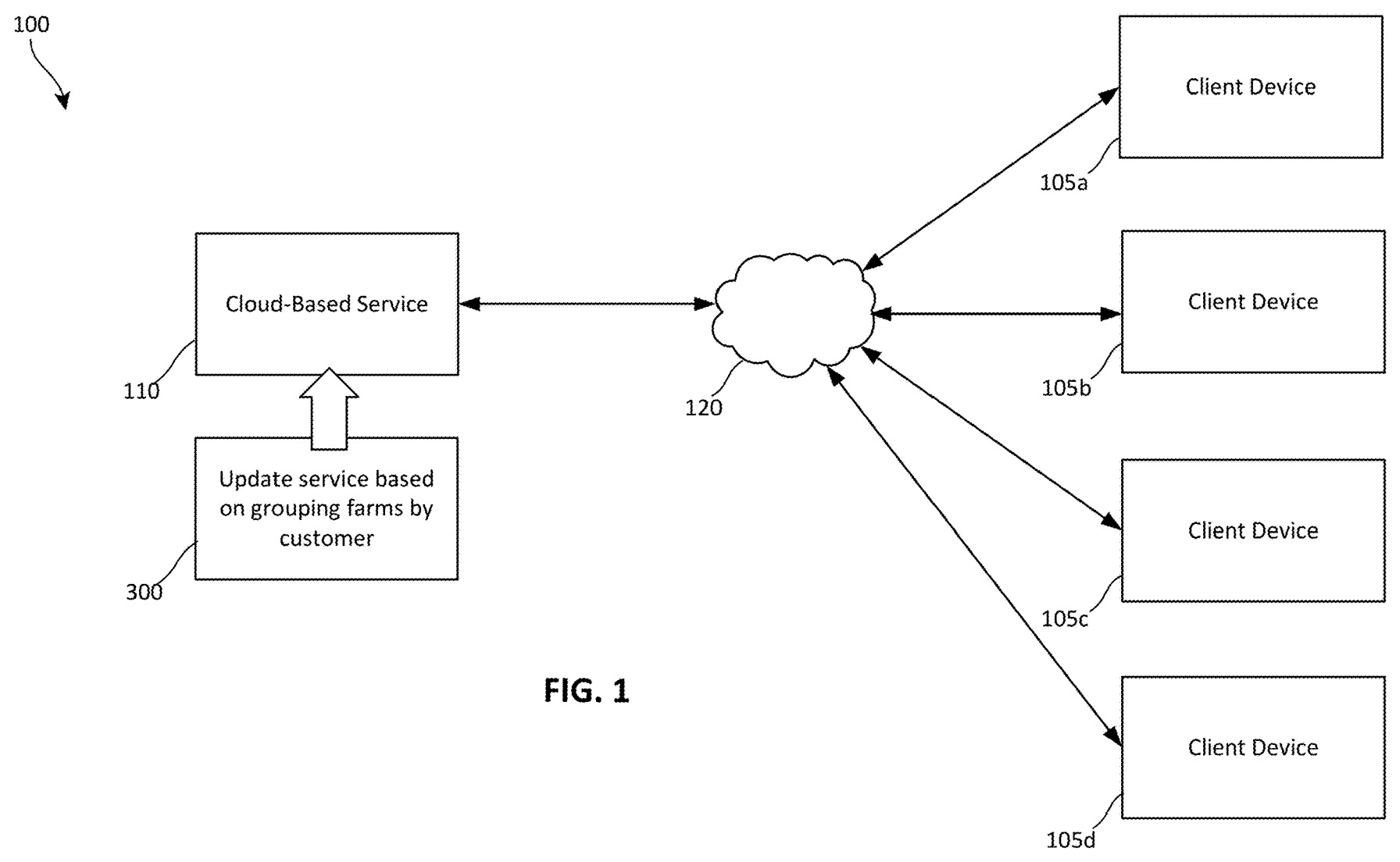

FIG. 1 is a diagram showing an example computing environment 100 in which the techniques for providing a more consistent user experience across the tenants of a particular customer are included. The computing environment 100 includes a cloud-based service 110 that provides any of the services discussed herein or any other cloud-based service to clients. The illustrative computing environment 100 includes one or more client devices, such as client devices 105a, 105b, 105c, and 105d, referred to collectively at client devices 105. The client devices 105 communicate with the cloud-based service 110 via the network 120. The network 120 may be a dedicated private network or the combination of public and private networks commonly referred to as the Internet.

In the example shown in FIG. 1, the cloud-based service 110 is implemented as a particular cloud-based service or set of services. These services may include, but are not limited to, applications for creating, consuming, and/or modifying content, file storage and management platforms, collaboration and communications platforms, and other types of software as a service (SaaS). The cloud-based service 110 may include numerous servers, network devices, storage elements and other components to support the various services that are provided by the cloud-based service. Logically, the cloud-based service can include different groups of virtual machines referred to as farms. Each farm may serve a specific corresponding segment of the userbase. Physically, the farms are supported by one or more computer servers configured to provide computational and/or storage resources for the virtual machines of the cloud-based service 110.

As used herein, the term "farm" refers to any grouping of virtual and/or physical machines used to provide cloud services. Farms may be grouped in a hierarchy, with each grouping also referred to as a farm. For example, a group of farms may be referred to as or by a farm label. Within a farm label, there may be farm groups referred to by a farm name.

Each farm may be configured to provide fail-over protection so that, if a virtual machine or computer server within the farm experiences a failure, the tasks assigned to that unit are handed off to another unit within the farm. The farm may also be configured such that one or more machines are taken offline temporarily to facilitate updates to the software and/or configuration data. For example, in a farm of two hundred virtual machines, only twenty virtual machines may be updated at a time while the other machines continue to provide service. This continues until the entire farm is updated. Other architectures are also possible.

A deployment policy generated for an update to the cloud-based service 110 accounts for the specific architecture and configuration of the virtual and hardware components involved. Furthermore, the cloud-based service 110 may also include other hardware and software to support various processes and services that support and maintain the various components of the cloud-based service 110.

The client devices 105 are computing devices that can be implemented as any of a variety of devices, for example, a portable electronic device such as a mobile phone, a tablet computer, a laptop computer, a portable digital assistant device, a portable game console, and/or other such devices. A client device 105 can also be implemented in computing devices having other form factors, such as a desktop computer, vehicle onboard computing system, a kiosk, a point-of-sale system, a video game console, and/or other types of computing devices.

While the example implementation illustrated in FIG. 1 includes four client devices, the subject matter herein is more particularly directed to much larger client populations, such as thousands or hundreds of thousands of client devices that utilize the cloud-based service 110. Furthermore, some features of the services provided by the cloud-based service 110 can be implemented with a native or agent application installed on the client device 105. The native application may communicate with the cloud-based service 110 over a network connection to exchange data with the cloud-based service 110 and/or to access features implemented on the cloud-based service 110.

As noted above, the cloud-based service 110 will regularly receive any number of updates to support and improve operations. Updates may be made to implement new features in the service or to fix issues occurring in the service.

These updates may be of several types. For example, updates may be made to the control layer, to the microservices or code, or to the configuration of the cloud-based service 110 or any of its underlying components. Code changes are also referred to as binary changes. As shown in FIG. 1, an update service 300, also referred to as an orchestrator, applies updates to the cloud-based service 110. This particular update service 300 uses a technique to group farms for update based on, among other things, grouping farms by customer irrespective of geographic location so as to provide a more consistent update experience for an individual customer. Customers with a higher degree of reliance on the cloud service may be prioritized in this arrangement.

FIG. 2 is a diagram showing a technique for deploying updates on a cloud-based architecture, such as that of the cloud-based service 110 shown in FIG. 1, using rings and stages. The ring configuration 210 includes three rings 215, 220, and 225. In this example configuration, the first ring 215 and the second ring 220 are associated with users in a pre-production environment in which the updates are initially tested. The pre-production environment refers to an environment internal to a provider of the cloud-based service where updates can be deployed and tested before being exposed to customers of the cloud-based service. Subsequently, in the production environment, users who are customers of the organization that provides the cloud-based service are provided access to the updates.

In the illustrated example, the first ring 215 is associated with a first internal group of users associated with the organization. These users may include members of the development team, testing team, and/or others who have been selected as a first set of users to receive and utilize the update. The computing devices of the users and/or components of the cloud-based service 110 may provide telemetry data. The users themselves may be prompted by the cloud-based service 110 to provide feedback on the update. This telemetry data and/or the user feedback are analyzed to determine whether the updates are operating as expected. The cloud-based service 110 may halt the deployment to the subsequent rings of the ring configuration 210 in response to determining that the updates are not operating as expected. Otherwise, the deployment process may continue with deploying the updates.

In the example shown in FIG. 2, the updates are next rolled out to additional users within the preproduction environment. In this example, the organization has many employees who are also users of the services provided by the cloud-based service 110. For example, the first ring 215 includes approximately 20,000 users, and the second ring 220 includes approximately 100,000 users associated with the organization. The preproduction environment in this example may be implemented on a separate farm or set of farms different from those in the production environment, and the updates may initially be deployed to the server or servers associated with the preproduction environment. In other implementations, the same farms or servers provide services to both the preproduction and production environments, and users are directed to the appropriate version of the software based on the group with which the users are associated. Telemetry and user data are collected from the users associated with the second ring 220, and the cloud-based service 110 may halt the deployment to the subsequent rings of the ring configuration 210 in response to determining that the updates are not operating as expected. Otherwise, the deployment process may continue with deploying the updates to the third ring 225.

The third ring 225 includes users that are using one or more production versions of the application or applications provided by the cloud-based service 110. Thus, the third ring 225 includes users that are outside of the organization and are customers who subscribe to the services provided by the cloud-based service 110. The third ring 225 may include a very large number of users. In this example, the third ring 225 may include millions or even billions of users. Thus, the third ring 225 may be further subdivided into stages, and each stage may include a subset of the users that make up the third ring 225. These stages are used to gradually roll out the updates to the full userbase and to provide another opportunity to collect and analyze telemetry data and/or user feedback from a broader userbase before deploying the updates to all users. Furthermore, each of the stages may represent internal ring boundaries used to subdivide the production userbase into logical groupings of users that utilize a specific production version.

The term "build" refers to a collection of updates being deployed together as a package. Different builds may be deployed to different rings and/or stages of rings to provide certain features to certain users of the userbase. For example, certain users may have access to a version of an application that has certain features that may not be provided in other versions of the application. Furthermore, certain features may not be available to users in certain regions for legal or compliance reasons. For example, privacy laws may prohibit the collection of certain types of telemetry data from the client devices 105 of the user, and the version of the update deployed to such regions omits the functionality associated with the prohibited types of telemetry data. These examples illustrate how the deployment policy for an update may be customized so that the deployment framework can deploy different versions of a build to different rings and/or stages of the rings.

Figure 3A:
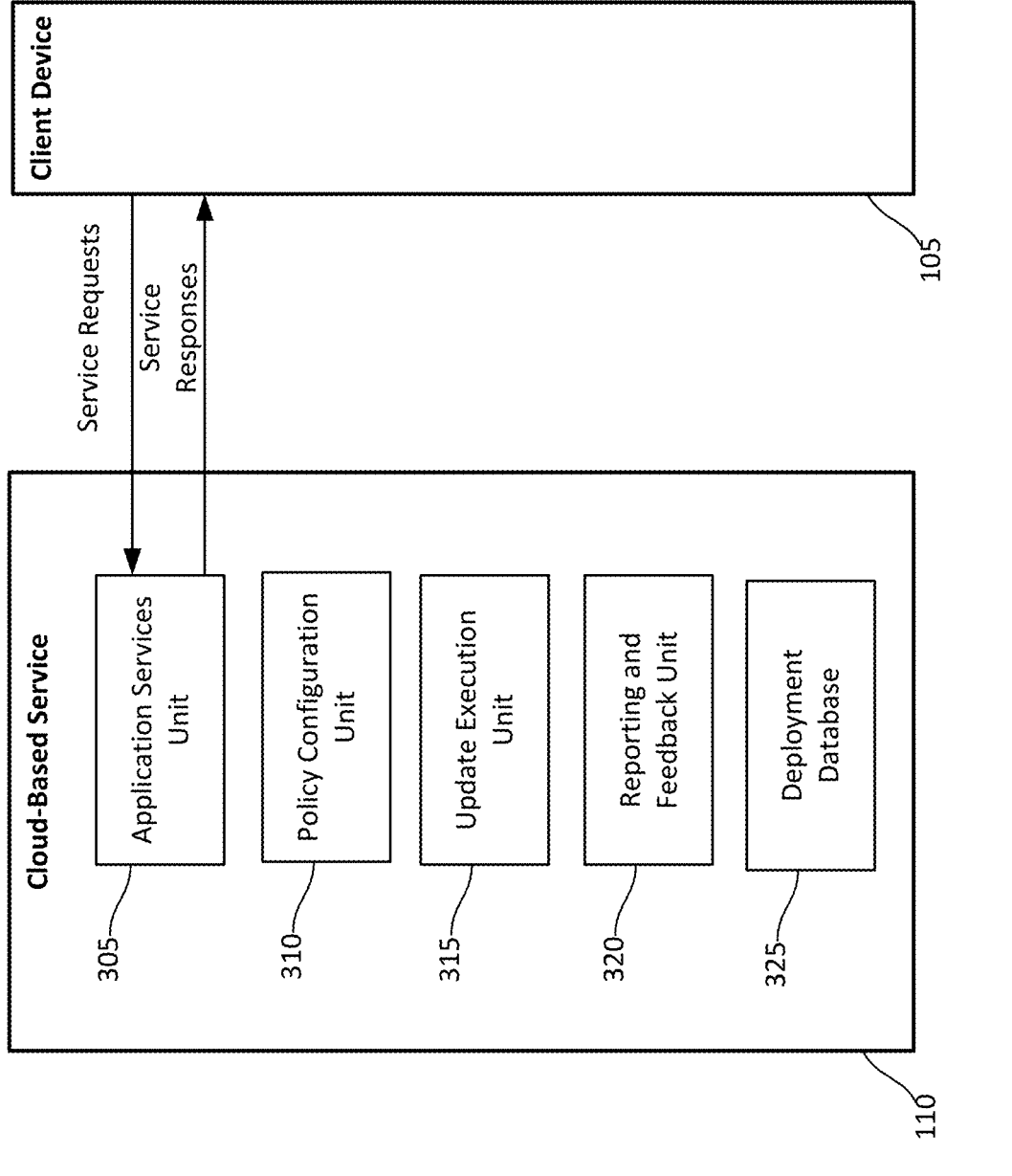
FIG. 3A is an example architecture for an update service that may be used, at least in part, to implement the cloud-based service.

FIG. 3A is an example architecture for an update service 300 that may be used, at least in part, to implement the cloud-based service 110. The cloud-based service 110 includes an application service unit 305, a policy configuration unit 310, an update execution unit 315, a reporting and feedback unit 320, and a deployment database 325.

The application service unit 305 is configured to provide the various services offered to customers of the cloud-based service 110. The application service unit 305 is configured to receive service requests from the client devices 105 of users and to provide service responses to the client devices 105 of the users. The specific types of services provided by the cloud-based service 110 may vary. These services may include but are not limited to providing applications for creating, consuming, and/or modifying content, file storage and management platforms, collaboration and communications platforms, and other types of SaaS.

The policy configuration unit 310, the update execution unit 315, the reporting and feedback unit 320, and the deployment database 325 are configured to provide the policy generation and execution functionality described herein. In the example shown in FIG. 3A, the policy generation and execution functionality are implemented on the cloud-based service 110 for which these functions are being performed. In other implementations, the deployment policy generation and execution functionality may be provided, at least in part, by separate services.

The policy configuration unit 310 is configured to receive a build policy configuration information about the update to be deployed. The cloud-based service 110 may provide a user interface in which an administrator provides information about the build. This user interface is illustrated and

Figure 3B:
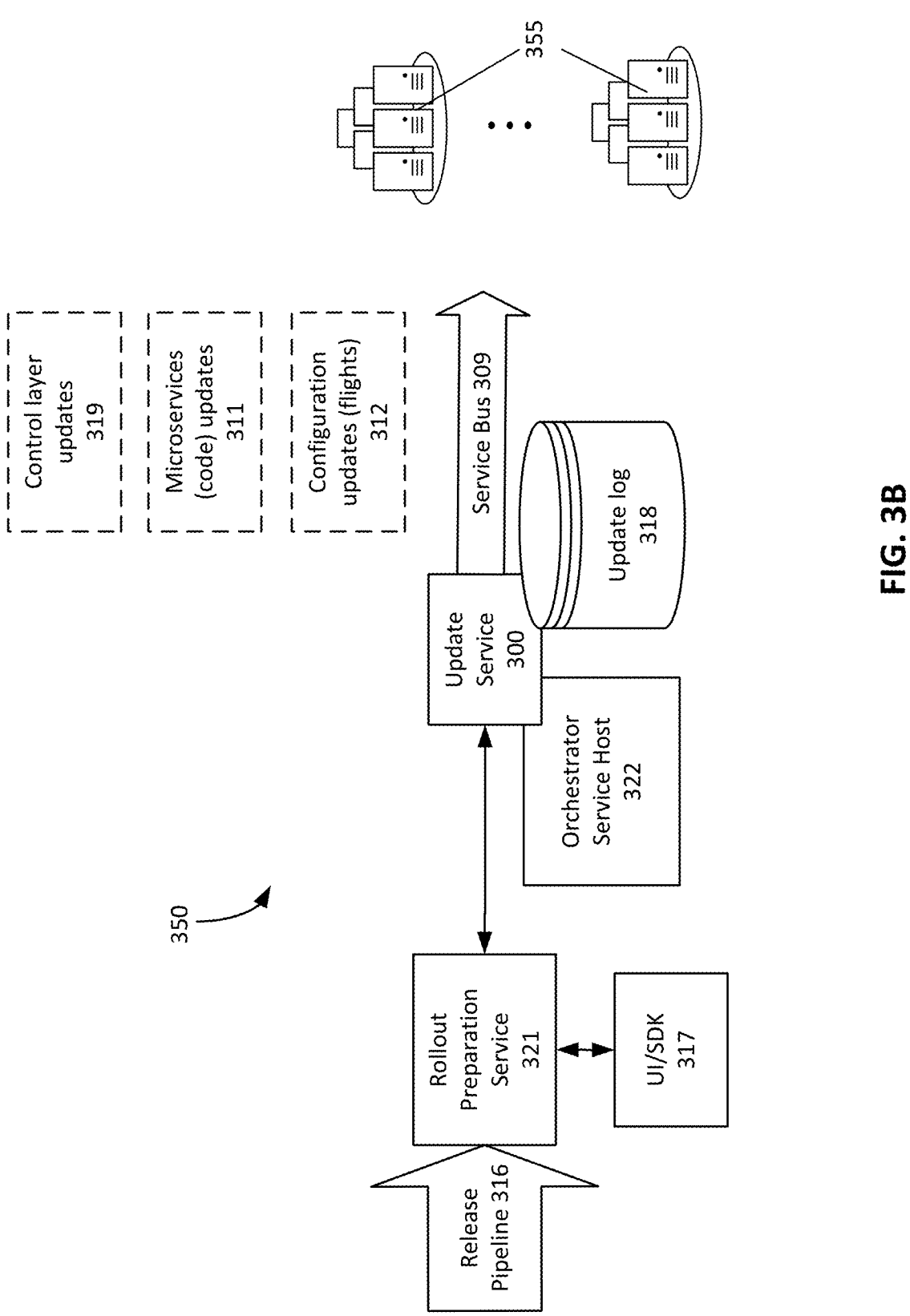
FIG. 3B is a diagram showing an example orchestration system for updating a cloud service.

7 described as element 317 in FIG. 3B. The user interface may include options for specifying one or more target rings and/or stages of the one or more rings. The user interface may also provide means for inputting when the update should be deployed. The deployment of the update may be scheduled to be deployed immediately or on a specific day or time. The scheduling feature may be useful for deploying updates that include new features that are to be made available to users on a specific date. The user interface may also provide means for selecting the payload of the update to be deployed. The payload may include executable program content, scripts, and/or configuration data that may be deployed as part of the update. The payload may include multiple new features and/or fixes for problems. The policy configuration unit 310 creates a deployment policy for the build based on the information provided by the administrator via the user interface. The update execution unit 315 is configured to execute the deployment policies generated by the policy configuration unit 310.

The reporting and feedback unit 320 is configured to receive telemetry data from components of the cloud-based service 110 and/or client devices 105 of users. The reporting and feedback unit 320 may be configured to analyze the telemetry data and/or user feedback received to generate reports that show the performance of the update that has been deployed based on the analyzed data. The feedback unit 320 may also automatically perform various actions in response to determining that the updates are not performing as desired.

The deployment database 325 is a database configured to store deployment policy information generated by the policy configuration unit 310 and data associated with the execution of the deployment policy. The deployment database 325 records for a deployment policy may include the location and/or file names of the payload to be deployed as the updates.

FIG. 3B is an example architecture 350 of the update service 300 described above with respect to FIGS. 1-3A and its supporting environment. As shown in FIG. 3B, a release pipeline 316 provides the updates to be implemented to a cloud-based service. Any number of developers may be working on different aspects of the cloud-based service and may submit updates via the pipeline 316.

A rollout preparation service 321 receives the updates from the pipeline 316. The rollout preparation service 321 may package a number of updates together for a single rollout. This may be referred to as a build. A user or administrator may operate a user interface 317, including a software development kit (SDK), to control the operation of the rollout preparation service 321 and the packaging or organization of the updates to be rolled out together in a specific build.

When prepared, the build is provided to the update service 300 for deployment. This update service 300 is also referred to as an orchestrator service and is hosted on a specialized computer system with processing and memory resources that is referred to as the orchestrator service host computer or machine 322. The host 322 connects to a network interface including a service bus 309. Thus, the orchestrator or update service 300 includes both software and hardware for implementing an update to the cloud service as described herein. In some examples, the orchestrator service host machine 322 includes a server, or a number of servers, with an interface to the network on which the cloud service is provided.

As will be described in more detail below, the update service 300 has a database in which is kept a log 318 of the update as it is deployed. The log 318, as described herein, can be on a stage-by-stage basis, a farm-by-farm basis or even machine-by-machine. Each of the components illustrated in FIG. 3B may be implemented on the same set of servers or devices as the update service 300 or on different networked machines as illustrated.

The update service 300 will deploy the update via the service bus 309 which is part of the network interface between the update service 300 and the network on which the cloud service is provided. The service bus 309 includes the network connecting all the components of the cloud service, for example, a Local Area Network covering the data center or server farm(s) that support the cloud service, a similar Wide Area Network or the internet. As noted above, the updates may be of different types including control layer updates 319, microservices or code updates 311 and configuration updates 312, also referred to as flights.

The components supporting the cloud service may be a number of farms 355. In this example and as defined above, each farm is a collection of virtual machines supported on some number of servers or other machines of the network. For example, a farm 355 may include two-hundred virtual machines. When a farm is updated, a subset of the virtual machines, e.g., ten, may be taken offline and updated at a time. Thus, some number of the virtual machines in the farm will be running the old software while some others will be running the updated software until the update of the farm is fully completed.

In the following description, farms are organized as follows. A farm grouping has a farm label. Under that farm label will be a number of farm names. Example: In the table below, FarmLabel1 includes FarmNames 1-5, while Farm-Label2 includes FarmNames 10-12. Each farm name is also associated with a temperature. In this context, temperature is a measure of how actively the machines of that farm name are being used. A higher temperature number indicates more usage. Consequently, when an update is being deployed, the conventional practice is to update farms with a lower temperature first. Because those farms are not being utilized as heavily, if there are any negative issues with the update, those issues will impact a fewer number of users or user operations than if the update were deployed to a farm with a higher temperature.

TABLE 1

| Source FarmLabel1 Name | Temp | -> | Destination FarmLabel2 Name | Temp |
|---|---|---|---|---|
| Farm Name1 | 100 | | FarmName10 | 30 |
| FarmName2 | 200 | | FarmName11 | 20 |
| FarmName3 (CWL) | 9000 | | FarmName12 | 10 |
| FarmName4 | 300 | | | |
| FarmName5 | 400 | | | |

A regional controller or resource manager (RM) is a software component or tool that is responsible for managing and allocating computing resources within a system or network. Resource managers can be used to manage a wide range of resources, including hardware devices, storage systems, network resources, and software applications. In a distributed computing environment, such as a cluster or a cloud computing platform, resource managers play an important role in optimizing resource utilization and ensuring that computing resources are efficiently allocated to meet the needs of the applications running on the system.

Resource managers often use algorithms and policies to determine how resources are allocated. They may also include features for monitoring resource usage, scheduling tasks, and managing job queues.

Figure 4:
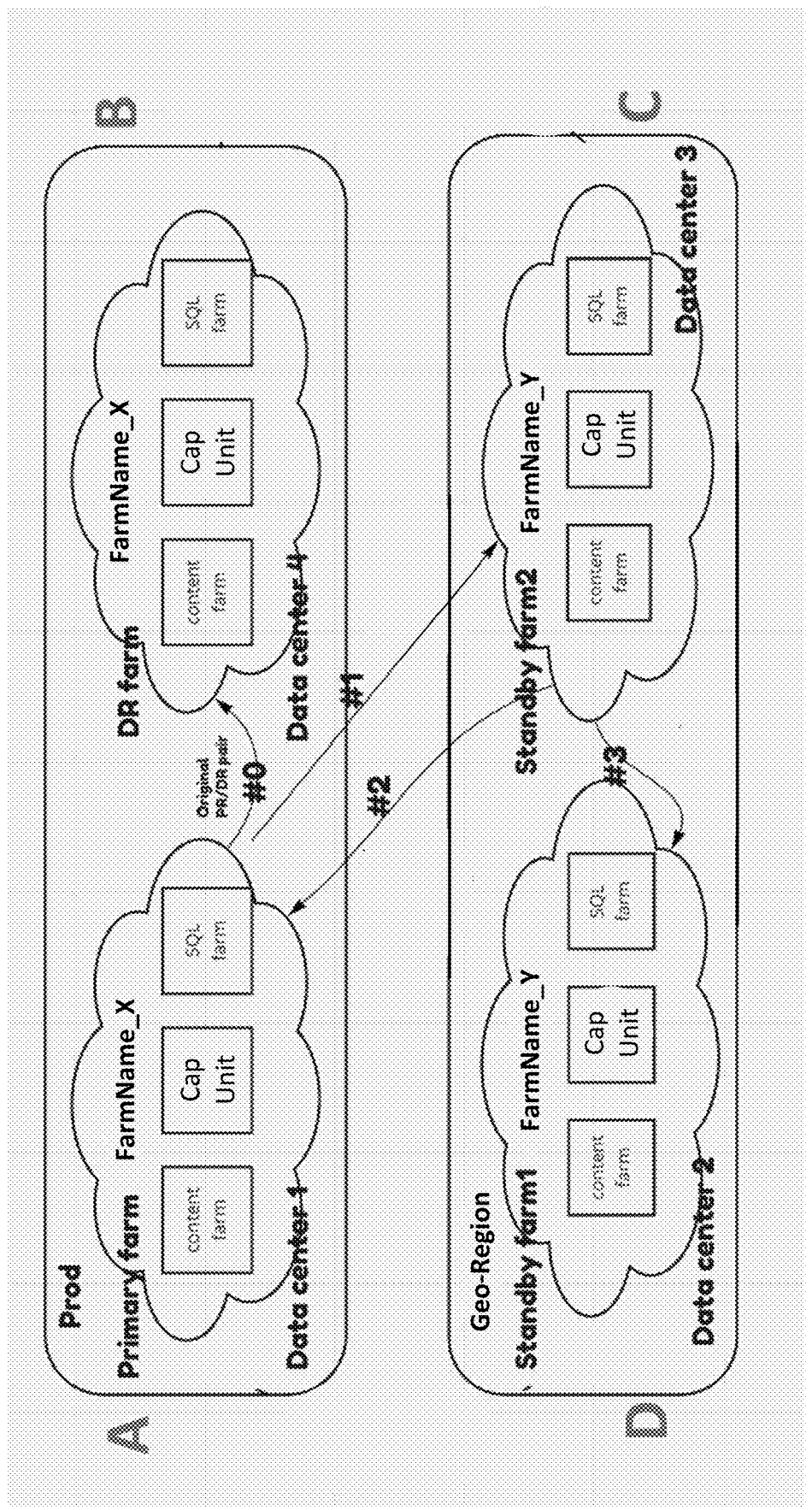
FIG. 4 is a diagram showing a cross-resource manager network move in which farm update synchronization is provided.

FIG. 4 illustrates a network-move for a farm pair. A farm pair includes a Primary Replica (PR) or Primary Farm matched with a Disaster Recovery (DR) farm. This pairing provides redundancy for the operation of the farm. In FIG. 4, the primary farm is located in Data center 1 under FarmLabel A which includes FarmName X. The other half of the pair, the DR farm is located in Data center 4, has FarmLabel B and FarmName X. Each of the primary and DR farms, includes a content farm, a capacity unit farm, and a Structured Query Language (SQL) farm.

FIG. 4 more specifically depicts a network-move for the farm pair (PR+DR/Active-Active) from a source-RM to a target-RM. For this move, the farms need to be in the same version (i.e., same build, though the revision might differ) before the data orchestration utility (DOU) can be initiated. Consequently, in this scenario, upgrades are shepherded by the update service 300. These farms (in source and destination) should start an upgrade in the same stage and batch so that these farms are always at the same version for a smooth network-move. The update service 300 thus needs to start shepherding these pairs towards the same version in response to receiving the signal for the network move.

As shown in FIG. 4, first (#1) a cross-RM attach operation attaches the primary farm FarmName_X to FarmName_Y of Standby farm 2 as the disaster recover farm of the pair. Then, in a cross-RM failover operation (#2), the PR/DR pair becomes FarmName_X/FarmName_Y. The move is then completed by a same-RM attach operation (#3) in which the PR/DR pair becomes FarmName_Y/FarmName_Y, shared between data centers 2 and 3.

As noted above, if an update is occurring, these farms (in source and destination) should start an upgrade in the same stage and batch so that these farms are always at the same version for a smooth network-move. One way to achieve this is to artificially adjust the temperature of these farms, for example, to a high value. If the update service is organizing update stages/batches by temperature, as described above, this should mean that the farms involved in the network move with artificially high temperature values will be allocated to the same update batch so that the move is not compromised by the farms being unevenly updated and then having different update versions. However, this can create other considerations such as that the source and destination may not be returned in the same batch subsequently for client queries.

Hosting any big cloud infrastructure requires the host to take care of customers including deploying changes safely on their tenants (e.g., a website) regardless of their geographical presence. As noted above, some larger customers might have multiple geographical locations in an international or even global presence. Customers can also undergo merger and acquisition transitions that lead to different locations and an increased geographical presence for their employees. Today, when changes are deployed to a cloud service, the changes are based on regions such as successive time zones. When changes do not deploy on the entire customer tenant at the same time, this can result in disparate experiences in service features and a risk of infrastructure units getting out of sync that leads to malware/security vulnerability. Consequently, the following description provides a technique to deploy changes on all cross-geographic or cross-cloud customer tenants in a safe, resilient and automated manner.

Specifically, the following describes an alternative approach to deploying cloud service updates to farms that need to be updated together regardless of geographical presence. The approach introduces a method to auto tag and group customer tenants across the globe to provide updates at a common stage or wave of deployment, while provide configurability which makes it dynamic irrespective of the cloud service infrastructure set up or scale. This approach can particularly address the migration of farms for a customer as a result of a merger or acquisition and coordinating of the software updates during such a migration to ensure a consistent customer experience across all tenants, including those newly belonging to the customer through the merger or acquisition.

To build on the previous example discussed above, there are two Farm Labels 1 and 2. FarmLabel1 comprises FarmNames 1-5 and FarmLabel2 comprises FarmNames 10-12, as shown in the following table.

TABLE 1

| Source FarmLabel1 Name | Temp | -> | Destination FarmLabel2 Name | Temp |
|---|---|---|---|---|
| FarmName1 | 100 | | FarmName10 | 30 |
| FarmName2 | 200 | | FarmName11 | 20 |
| FarmName3 | | | FarmName12 | 10 |
| (CWL) | 9000 | | | |
| FarmName4 | 300 | | | |
| FarmName5 | 400 | | | |

In some examples, the destination farm label or stand-by farms are new farms that don't have any live customers. In other examples, the destination farm label does have an active customer, for example, a customer that is merging with or acquiring a target company that is currently using a different farm label. For example, assume that a parent company (P) has acquired or merged with a target company (T). The parent company (P) has its Primary Replica (P-PR) in FarmLabel2, FarmName11 and its Disaster Recover (P-DR) in FarmName12. In Table 2 below, the farm labels are illustrated by boxes and the farm names by the numbers within the boxes. The target company has its Primary Replica (T-PR) in FarmLabel1, FarmName1 and its Disaster Recover (T-DR) in FarmLabel1, FarmName4, as shown in the table below.

TABLE 2

| T-PR | T-DR | | | | | P-PR | P-DR |
|---|---|---|---|---|---|---|---|
| 1 | 2 | 3 | 4 | 5 | . . . | 10 | 11 | 12 |

Following the acquisition of the target company, T-PR and T-DR are to be moved from FarmLabel1 to FarmLabel2 where the PR/DR pair of the parent company resides. As explained, software updates are to be provided at the same time to these farms to ensure a smooth transfer and maintain consistency and security.

Consequently, a table is created that pairs farm names for update batches to keep source and destination farm names together. Thus, in the current example, FarmName 1 of the source farm label has the lowest temperature in the source and FarmName 12 has the lowest temperature in the destination. Thus, FarmName1 and FarmName 12 are paired. FarmName 4 contains T-DR to be moved and is paired with FarmName 11 which has the next lowest temperature in the destination farm name.

TABLE 3

| FarmName1 | FarmName2 | FarmName4 | FarmName5 | FarmName3 (CWL) |
| FarmName12 | | FarmName11 | | FarmName10 |

In the above example, FarmLabel1 will be moved to FarmLabel2. The pairs will be created using the following rules:

1. The result array will be sorted by source name temperatures and the items will be paired with farm names in destination label.
2. The first names in source and destination labels will be paired.
3. The last name in source and destination labels will be paired.
4. Remaining names in the labels will be paired to evenly spread out the labels.

Figure 5A:
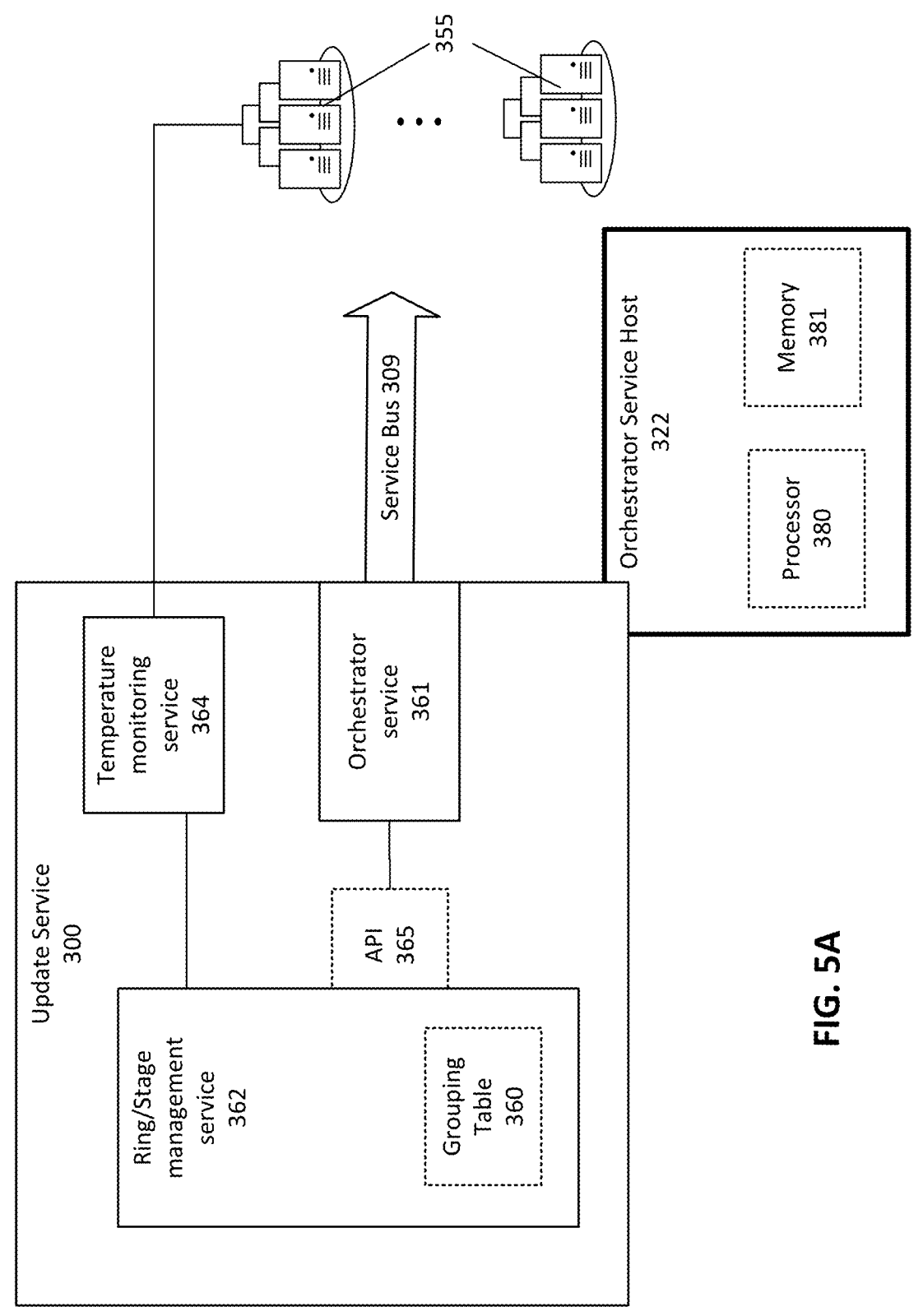
FIG. 5A is diagram of an example orchestrator for updating a cloud service with synchronization for the farms of a particular customer.

Referring to FIG. 5A, the table 360 (e.g., Table 3 above) is generated according to the principles of the example above and may be maintained by a ring/stage management service 362 of the update service 300. The grouping table 360 groups together farms (e.g., by label or name) that are to be updated at about the same time, i.e., included in the same ring and stage.

As described above, an orchestrator service host 322 is a specialized, purpose-built computer that includes a processor 380 and memory 381 and hosts the update service 300 including an orchestrator service 361. The orchestrator service 361 of the update service 300 will query the ring/stage management service 362 via an Application Programing Interface (API) 365 as to which farms 355 of a userbase are to be updated in each ring/stage of the update. For example, each stage within the production ring may be an additional 10% of the userbase. In another example, a first stage of the production ring may be 25% of the userbase, a second stage may be 50% of the userbase, a third stage 75% of the userbase and a fourth stage the entirety of the userbase. Consequently, when the orchestrator service 361 calls for the first stage, the stage management service 362 will identify farms representing the first 10 or 25% of the userbase, for example, to update as the first stage.

A temperature monitoring service 364 of the update service 300 monitors and measures the temperature of the farms 355. As noted above, this temperature can be measured on a farm label, farm name, machine or other basis. This temperature information is available to the stage management service 362. As noted above, the stage management service may use temperature information when placing farms 355 into a stage of the update rollout. Farms 355 with a lower temperature, i.e., with lower utilization by customers, are typically placed in an earlier stage than farms with a higher temperature.

However, as noted above, this approach may divide farms into different stages that need to be updated together. Consequently, the ring/stage management service 362 maintains a grouping table 360, as described above, that tags farms (e.g., by farm label and/or farm name) that need to be updated together. Thus, when directing the orchestrator service 361 as to which farms to update in each stage of the rollout, farms that need to be updated together are kept in the same stage or batch by referring to the grouping table in addition to temperature data.

Thus, the update service 300 of FIG. 5A provides for registering the pairs/groups in a maintainable way and unit-testable way. Using this data, for FarmLabel based requests (from the orchestrator service 361), both the labels in the pairs will be returned in the same batch (following source farm's label temperature). For FarmName based requests, pairs will be returned based on source farm name temperature, i.e., the first farm in the destination will be paired with the first farm in destinations. The remaining farms will be paired evenly. This provides a way to register overrides for farms (by name or label) as different override/group types.

The API 365 may include multiple APIs for different techniques. For example, an API for updates based on farm labels might be:

IEnumerable<FarmInfo>        GetFarmLabels([FromUri]
        FarmTemperatureFilter    filter,    [FromUri]    string
        caller=null)

And, and an API for updates based on farm names might be:

IEnumerable<FarmNameInfo>        GetFarmNames([Fro-
        mUri] FarmTemperatureFilter filter, [FromUri] string
        caller=null)

Again, a dedicated table will be used to store all override information for a farm. This design is targeted to stop using farm temperature manipulation and maintain the farm name groupings for XRMNM using a separate table. XRMNM refers to a cross-RM Network Move, i.e., a network move that moves a farm pair in one farm label to another farm label in a different resource manager or regional controller.

Figure 5B:
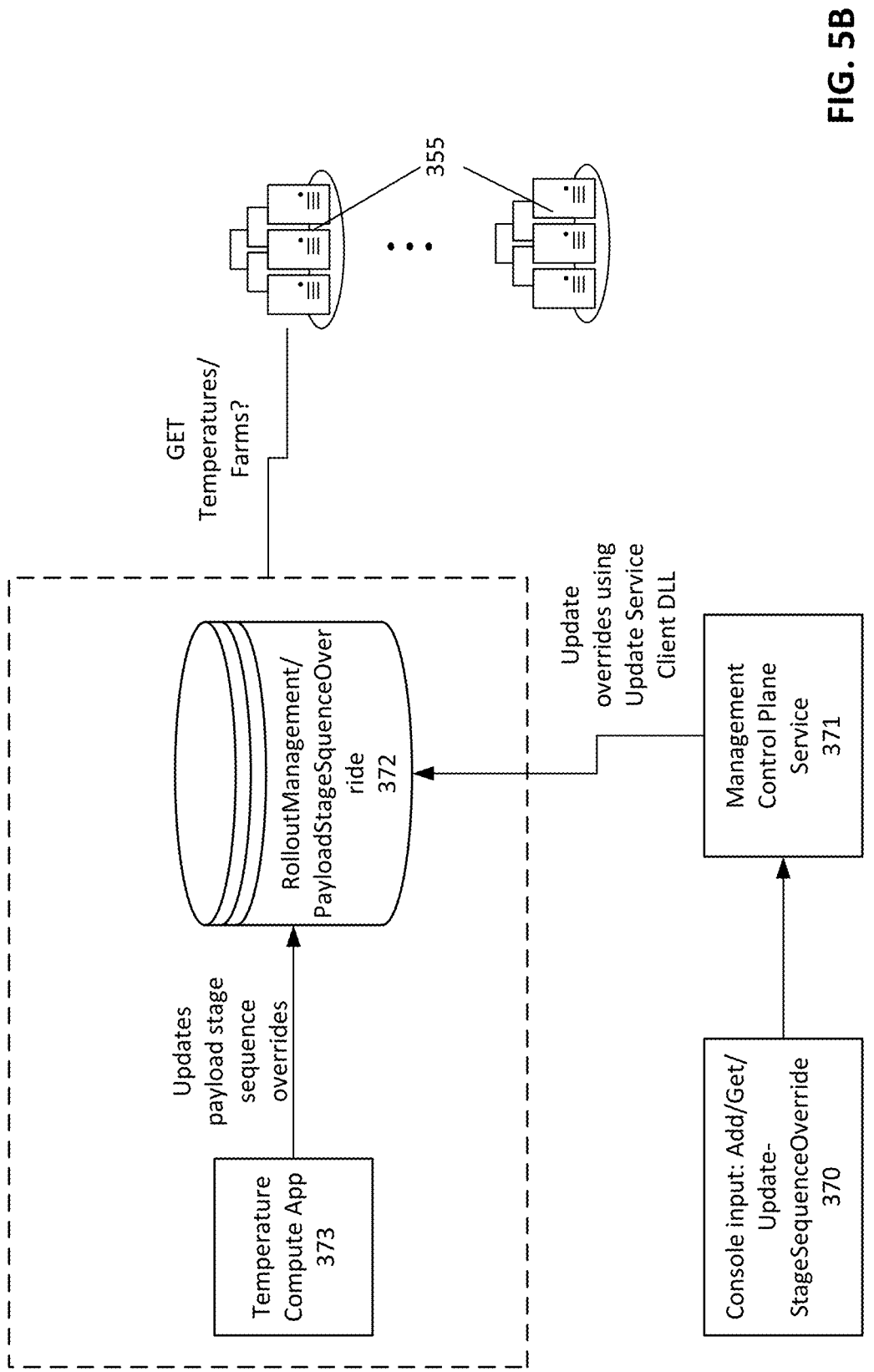
FIG. 5B is another diagram of an example orchestrator for updating a cloud service with synchronization for the farms of a particular customer.

FIG. 5B is another illustration of a system for generating the table. In this example, farm names and labels are registered using console input commandlets. Console inputs can be a cross-platform post-exploitation Command & Control server and agent written in Go. As shown in FIG. 5B, when a need is identified to keep farms (e.g., by name or label) in the same stage of an update rollout, this grouping needs to override other considerations, such a temperature, for placing these farms in the same rollout stage. Thus, a corresponding console input commandlet 370 is issued to add, get or update a stage sequence override. This commandlet is input to a management control plane service 371. This management control plane service 371 updates the overrides stored in a database 372. These updates are made using a service client Dynamic Link Library (DLL) accessible to the management control plane service. The database 372 stores, for example, the dedicated table described above, among other data, that pairs together the farms that need to be in the same update stage. The database 372 thus stores rollout management/payload stage sequence override data.

As before, a temperature compute application 373 may be tracking and measuring the temperature, e.g., customer activity, for the farms. This may be on a label, name or individual virtual machine basis. The temperature compute application 373 provides updates to the payload stage sequence overrides in the database 372 based on temperature data. Consequently, the overrides stored in the database 372 account for both temperature, which fluctuates dynamically over time, and groupings that override temperature considerations when placing farms in stages of an update rollout.

Thus, farms, by name or label, that are part of the same XRMNM activity, can be tagged with a Group Number (Group #). This will be used by the service illustrated in FIG. 5B to place them together in the returned results when a stage is being formed for an update deployment.

Figure 5C:
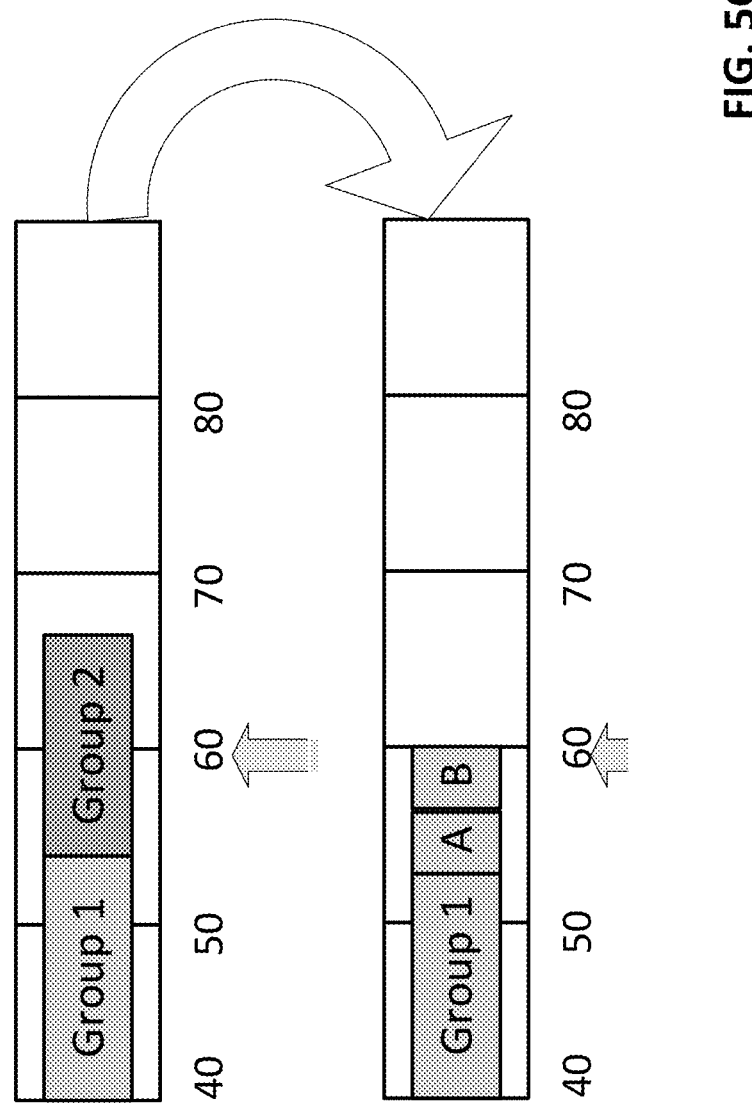
FIG. 5C is a diagram of the operation of the systems of FIGS. 5A and 5B when a requested percentage of farms would split a group of farms into different stages that are to have a synchronized update.

FIG. 5C illustrates the operation of the system of FIGS. 5A and 5B in a particular example. If a farm name/label in an XRMNM is paired or bundled with another farm/label that is registered in the same Group #, these farms will be moved together. If the requested percentage of the userbase for inclusion in the next rollout stage will split a group resulting in an incomplete group, the result will be amended to remove the incomplete group and fill up empty positions with untagged farm(s). For example, as shown in FIG. 5C, the orchestrator is requesting 60% of the userbase for a next rollout stage. If a request for 60% of the farms is going to split a group, e.g., Group 2 in FIG. 5C, then the incomplete group will be removed from the current stage. The resulting empty positions will be filled with other untagged farms, designated as A and B in FIG. 5C, based on their deterministic temperatures.

If a system has previously been trying to keep farms that need to be updated together in the same stage by artificially adjusting farm temperature data, this approach needs to be decommissioned. A clean-up activity needs to be executed to remove all code that alters temperature from its natural computed numbers and classes should be updated to use the override table. Then, the technique adds new table and table storage procedures to capture all stage sequence overrides as described herein. Commandlets can then be added to perform Create, Read, Update, and Delete (CRUD) operations.

For example, the commandlet can validate provided farm labels and check that the destination farm (2nd element in the array) is a standby farm. This will be done using the Configuration property on the Farm object. The commandlet can also verify a maximum allowed number of overrides. If a limit is exceeded, more records can be created using, for example, the OverrideLimitWithGEMApproval parameter.

Thus, as described herein, a method is provided to auto tag and group customer tenants across the globe to provide updates at a common stage or wave of deployment. The system can also be configurable based on customer type. For example, a customer type, such as a financial service company, may be particularly sensitive to having all their employees on the same version of software in the cloud service. If the company is closing out books at the end of a reporting period, for example, it may be necessary for all the employees, regardless of location, to be operating on the same version of a cloud service. Consequently, for customers that have a particular sensitivity to employees in different regions using different versions of the cloud service, the group of farms utilized by such a customer can be grouped with priority in the table described above to minimize any time between updates to the farms they utilize.

Additionally, the table described can account for customers who are using multiple clouds for their cloud service. For example, a variety of providers offer cloud resources to customers, including Microsoft®, Google® and Amazon®. A particular customer may have employees that are using different clouds. Consequently, the table described herein can identify the different clouds on which a specific customer has tenants and then group the corresponding farms from different clouds so that an update is deployed at around the same time, even on different clouds, to the users of that specific customer.

The system described may also limit the percentage of customer tenants in each grouping, i.e., by cloud offering, region or network infrastructure. Otherwise, the system may have difficulty managing the group and efficiently deploying updates with efforts to keep the client tenants on the same update version to the extent possible. Without such limits, the number of customer tenants in a group may become too large to manage updates effectively.

The system is also configurable based on cloud infrastructure type or configurable based on capacity. This allows the technique to be data-driven in terms of resources used to synchronize updates for a particular customer. Consequently, customers with priority can be serviced with synchronized updates to the extent that the benefit justifies the additional resources used and not otherwise.

The system can also have an override to break the tagging/grouping based on customer input, for example, in case of a subsidiary division or company splitting off or being sold. If a customer does not want or need the synchronization of updates amongst their employees, the customer can override the application of synchronized updates for their employes. Similarly, there can be a configurable expiration date. If the customer wants updates to their cloud service synchronized for all employees for a sensitive period of time, but not thereafter, the system can take an input of that configurable expiration date and then stop grouping the customer's farms for synchronized update after that expiration date.

Figure 6:
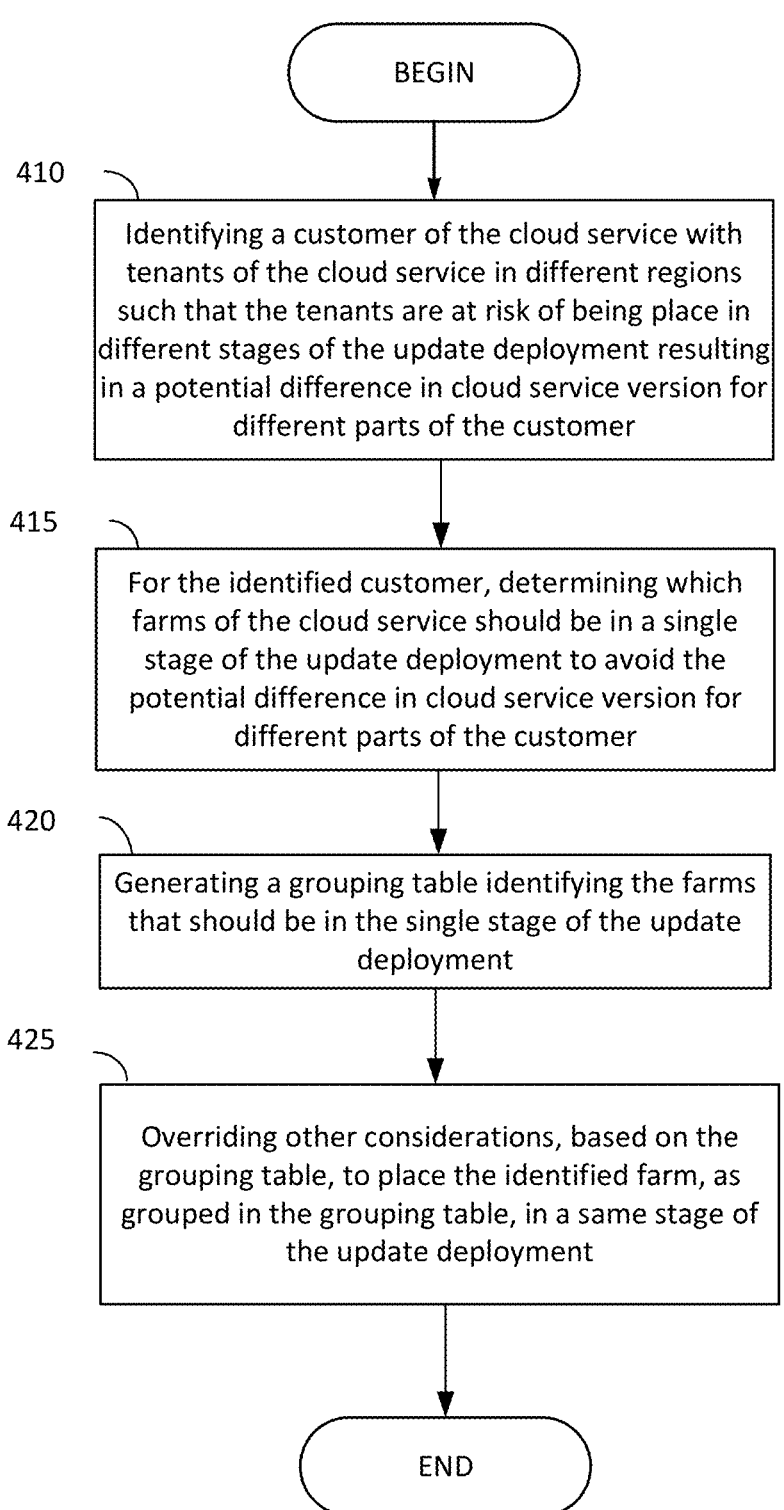
FIG. 6 is a flowchart of an example method of providing synchronized cloud service updates for a customer spread over different farms supporting the cloud service.

FIG. 6 is a flowchart of an example method of providing synchronized cloud service updates for a customer spread over different farms supporting the cloud service. Specifically, FIG. 6 illustrates a method of deploying updates for a cloud service that is supported by a population of farms, the update being deployed in a series of stages that successively include a larger percentage of a userbase. As shown in FIG. 6, the method begins by identifying 410 a customer of the cloud service with tenants of the cloud service in different regions such that the tenants are at risk of being place in different stages of the update deployment resulting in a potential difference in cloud service version for different parts of the customer.

Next, for the identified customer, the method includes determining 415 which farms of the cloud service should be in a single stage of the update deployment to avoid the potential difference in cloud service version for different parts of the customer. The method then generates 420 a grouping table identifying the farms that should be in the single stage of the update deployment. Lastly, the method includes overriding 425 other considerations, based on the grouping table, to place the identified farm, as grouped in the grouping table, in a common stage of the update deployment.

Figure 7:
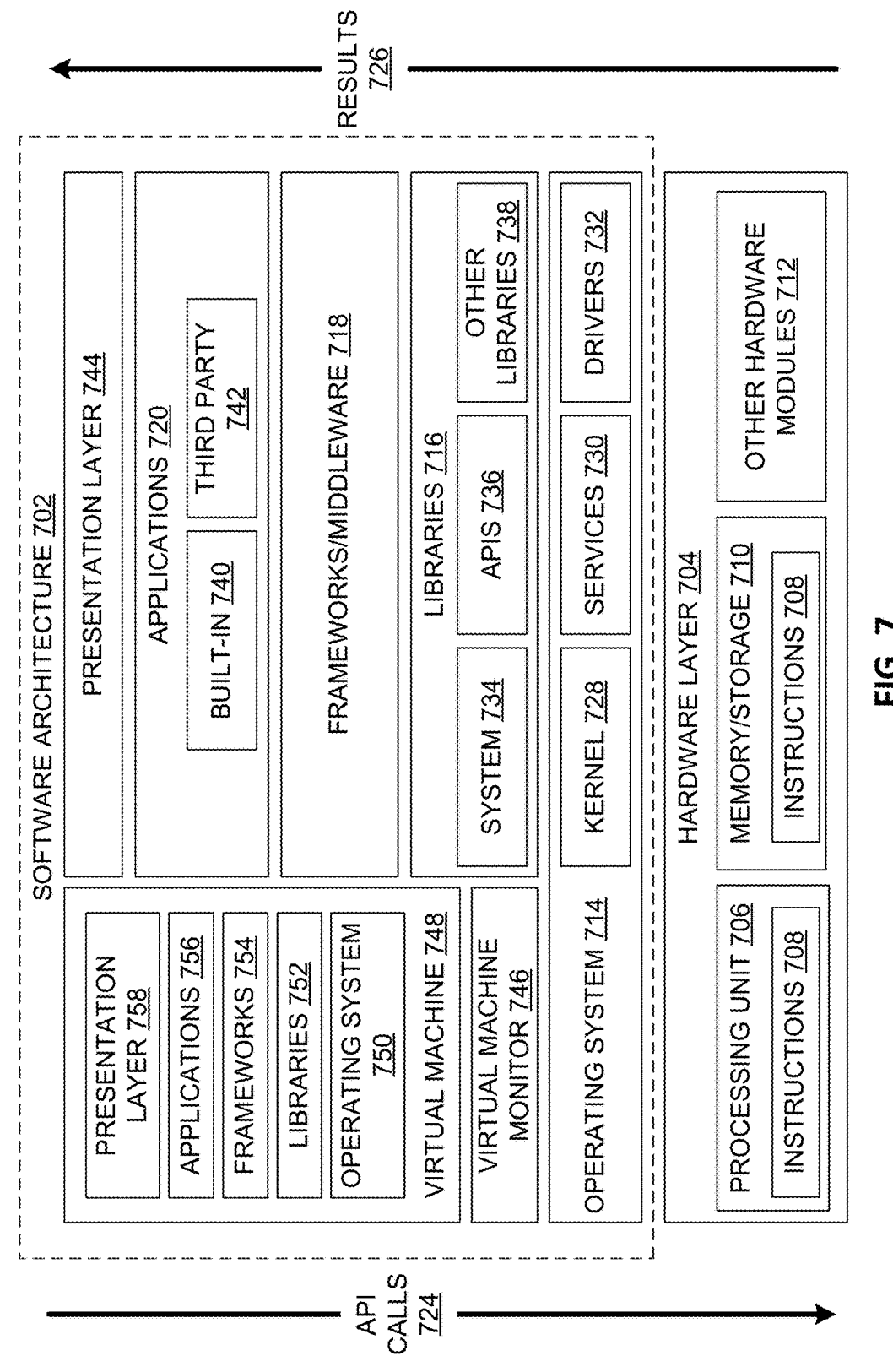
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. This software architecture may represent the software of the update service 300 or other component shown in FIG. 3B. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
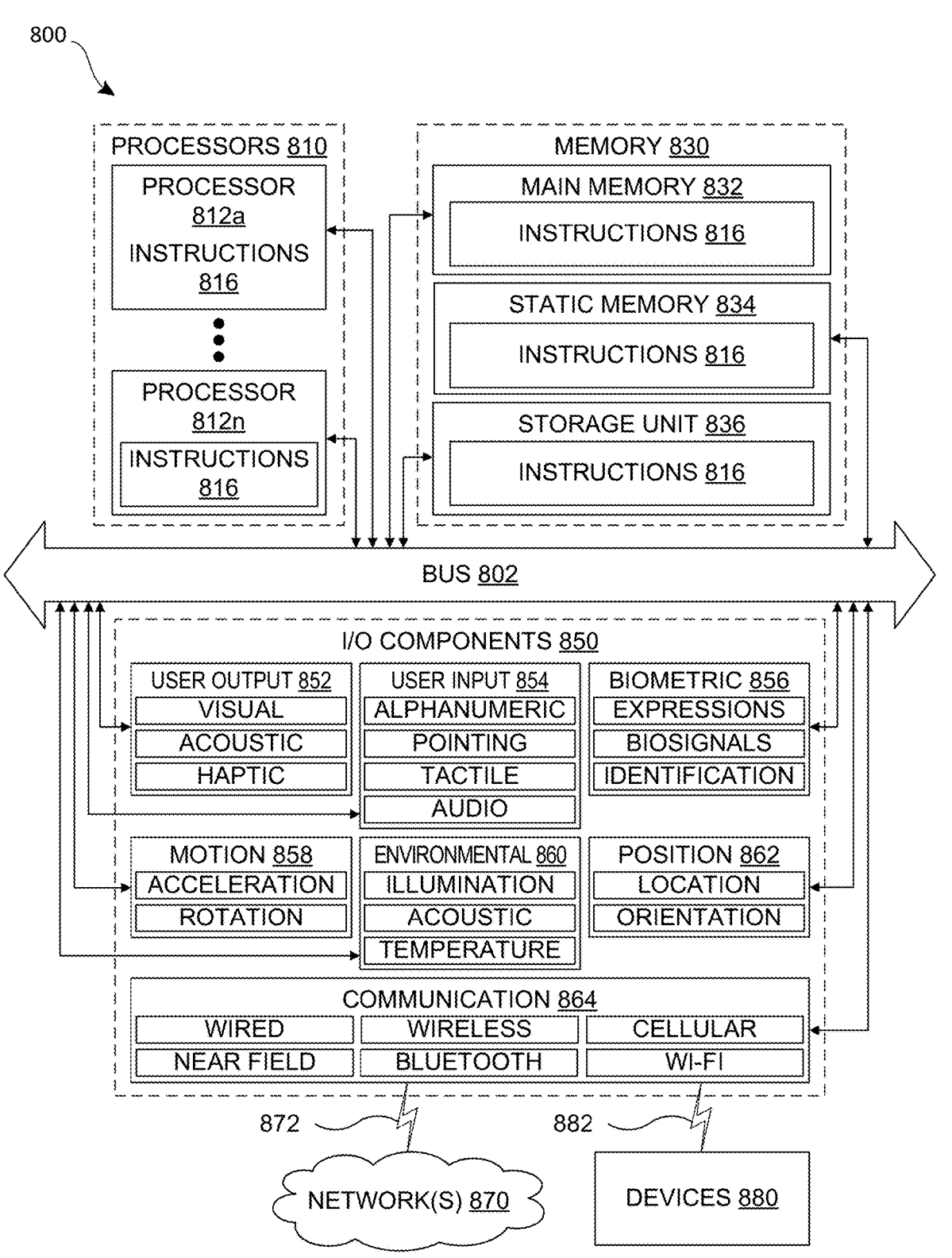
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. This example machine may represent the hardware of the update service 300 or other component shown in FIG. 3B.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. An orchestrator for updating a cloud service comprising:
    an orchestrator service host computer comprising a processor and memory;
    an orchestrator service for execution by the orchestrator service host computer for orchestrating updates to farms of the cloud service over a service bus;
    a stage management service for determining which farms should be in each stage of an update deployed by the orchestrator service; and
    a grouping table identifying farms that should be in a common stage of the update deployed by the orchestrator service,
    wherein the stage management service places farms grouped in the grouping table in a common stage of the update deployment.

Item 2. The orchestrator of Item 1, further comprising a temperature monitoring service for determining a temperature of individual farms, wherein the stage management service determines which farms should be in each stage of update deployment based on farm temperature except as overridden by farm groupings in the table.

Item 3. The orchestrator of Item 2, wherein the stage management service is to determine when a requested percentage of a userbase for a next update stage, based on farm temperature, would split a first group of farms grouped in the grouping table into different update stages and, in response, hold the first group of farms for update in a subsequent stage that will not split the first group.

Item 4. The orchestrator of Item 3, wherein, when holding the first group of farms for the subsequent stage, the stage management service fills a current stage with other farms that are not grouped in groups large enough to be split due to the requested percentage of the userbase.

Item 5. The orchestrator of Item 1, further comprising an Application Programming Interface (API) of the stage management service through which the orchestrator service requests an identification of farms for each stage of update deployment.

Item 6. The orchestrator of Item 5, wherein farms are grouped in a hierarchy using labels and names, with a farm label comprising a plurality of farms with different farm names.

Item 7. The orchestrator of Item 6, wherein the API of the stage management service comprises:
    a first API for when farms for update in a common stage are grouped by farm label; and
    a second API for when farms for update in a common stage are grouped by farm name.

Item 8. The orchestrator of Item 6, wherein the orchestrator service performs synchronization of updates to grouped farm names as part of a cross-regional controller network move.

Item 9. A method of deploying updates for a cloud service that is supported by a population of farms, the update being deployed in a series of stages that successively include a larger percentage of a userbase, the method comprising:
    identifying a customer of the cloud service with tenants of the cloud service in different regions such that the tenants are at risk of being place in different stages of the update deployment resulting in a potential difference in cloud service version for different parts of the customer;
    for the identified customer, determining which farms of the cloud service should be in a single stage of the update deployment to avoid the potential difference in cloud service version for different parts of the customer;
    generating a grouping table identifying the farms that should be in the single stage of the update deployment; and
    overriding other considerations, based on the grouping table, to place the identified farm, as grouped in the grouping table, in a common stage of the update deployment.

Item 10. The method of Item 9, further comprising:
    with a temperature monitoring service, determining a temperature of individual farms; and
    determining which farms should be in each stage of update deployment based on farm temperature except as overridden by farm groupings in the table.

Item 11. The method of Item 10, further comprising:
    determining when a requested percentage of a userbase for a next update stage would, based on farm temperature, split a first group of farms grouped in the grouping table into different update stages and,
    in response, holding the first group of farms for update in a subsequent stage that will not split the first group.

Item 12. The method of Item 11, further comprising, when holding the first group of farms for the subsequent stage, filling a current stage with other farms that are not grouped in groups large enough to be split due to the requested percentage of the userbase.

Item 13. The method of Item 9, further comprising an Application Programming Interface (API) of a stage management service through which an orchestrator service requests an identification of farms for each stage of update deployment.

Item 14. The method of Item 13, wherein farms are grouped in a hierarchy using labels and names, with a farm label comprising a plurality of farms with different farm names.

Item 15. The method of Item 14, wherein the API of the stage management service comprises:

a first API for when farms for update in a common stage are grouped by farm label; and a second API for when farms for update in a common stage are grouped by farm name.

Item 16. The method of Item 14, wherein synchronization of updates to grouped farm names is performed as part of a cross-regional controller network move.

Item 17. The method of Item 9, wherein use of the grouping table is subject to an expiration data or user input to end synchronization of updates to grouped farms.

Item 18. The method of Item 9, wherein grouping farms for a customer in the grouping table is provided based on customer type.

Item 19. A processing system comprising:

a processor;

a network interface to a service bus in communication with a population of farms supporting a cloud service;

a memory storing executable instructions which, when executed by the processor, cause the processor, alone or in combination with other processors, to implement a cloud service update orchestration service, the orchestration service comprising a database of payload stage sequence overrides for when farms are being allocated to a stage of an update deployment; and a management control plane service to update the overrides based on an update service client dynamic link library, the overrides protecting a group of farms from being allocated to different stages of the update deployment.

Item 20. The processing system of Item 19, further comprising a temperature compute application to determine a temperature for farms in the population of farms and update the payload stage sequence overrides based on the determined temperatures.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An orchestrator for orchestrating software updates, comprising:

an orchestrator service host computer comprising a processor and memory, the memory comprising computer executable instructions that, when executed by the processor, cause the orchestrator service host computer to:

identify systems of a software service that are in scope for receiving the software updates;

determine a respective level of usage for each of the systems;

place the systems of the software service into a plurality of stages of an update to the software service based on the level of usage and based on a grouping table identifying groups of the systems to be placed in a same stage, the placing of the systems including determining a first placement of the systems into a first stage based on the level of usage of the systems and a desired size of the first stage, and in response to a determination that a first group of the systems in the grouping table will be split between the first stage and subsequent stages, determining a second placement by altering the first placement by removing the systems of the first group from the first stage and placing the systems of first group into a second stage subsequent to the first stage; and applying the update to the software service based on the second placement, including applying the update to systems placed in the first stage of the second placement, and after applying the update to systems in the first stage of the second placement, applying the update to the systems in the second stage subsequent to the first stage in the second placement.

2. The orchestrator of claim 1, wherein the placing of the systems further includes determining when a requested percentage of a userbase for a next update stage, based on the usages of the individual systems, would split the first group of systems grouped in the grouping table into different update stages and, in response, holding the first group of systems for placement in a subsequent stage that will not split the first group of systems.

3. The orchestrator of claim 2, wherein, when holding the first group of systems for the subsequent stage, the placing of the systems fills a current stage with other systems that are not grouped in groups large enough to be split due to the requested percentage of the userbase.

4. The orchestrator of claim 1, further comprising an Application Programming Interface (API) through which the orchestrator requests an identification of the systems for each stage of the update.

5. The orchestrator of claim 4, wherein the systems are grouped in a hierarchy using labels and names, with a system label comprising a plurality of systems with different system names.

6. The orchestrator of claim 5, wherein the API comprises:

a first API for when the systems for update in a common stage are grouped by the system label; and a second API for when the systems for update in the common stage are grouped by the different system names.

7. The orchestrator of claim 5, wherein the orchestrator performs synchronization of updates to grouped system names as part of a cross-regional controller network move.

8. A method of deploying an update for a software service that is supported by a population of computer systems, the update being deployed in a series of stages that successively include a larger percentage of a userbase, the method comprising:

identifying a customer of the software service with tenants of the software service in different regions such that the tenants are at risk of being placed in different stages of the update resulting in a potential difference in software service version for different parts of the customer;

for the identified customer, identifying systems of the software service that are in scope for receiving the software updates;

determining a respective level of usage for each of the systems;

placing the systems of the software service into a plurality of stages of an update to the software service based on the level of usage and based on a grouping table identifying groups of the systems to be placed in a same stage, the placing of the systems including determining a first placement of the systems into a first stage based on the level of usage of the systems and a desired size of the first stage, and in response to a determination that a first group of the systems in the grouping table will be split between the first stage and subsequent stages, determining a second placement by altering the first placement by removing the systems of the first group from the first stage and placing the systems of first group into a second stage subsequent to the first stage, and applying the update to the software service based on the second placement, including applying the update to systems placed in the first stage of the second placement, and after applying the update to systems in the first stage of the second placement, applying the update to the systems in the second stage subsequent to the first stage in the second placement.

9. The method of claim 8, further comprising:

determining when a requested percentage of a userbase for a next update stage would, based on the usages of the individual systems, split the first group of systems grouped in the grouping table into different update stages and, in response, holding the first group of systems for placement in a subsequent stage that will not split the first group of systems.

10. The method of claim 9, further comprising, when holding the first group of systems for the subsequent stage, filling a current stage with other systems that are not grouped in groups large enough to be split due to the requested percentage of the userbase.

11. The method of claim 8, further comprising an Application Programming Interface (API) through which an orchestrator service requests an identification of the systems for each stage of the update.

12. The method of claim 11, wherein the systems are grouped in a hierarchy using labels and names, with a system label comprising a plurality of systems with different system names.

13. The method of claim 12, wherein the API comprises:

a first API for when the systems for update in a common stage are grouped by system label; and a second API for when the systems for update in the common stage are grouped by system name.

14. The method of claim 12, wherein synchronization of updates to grouped system names is performed as part of a cross-regional controller network move.

15. The method of claim 8, wherein use of the grouping table is subject to an expiration date or user input to end synchronization of updates to grouped systems.

16. The method of claim 8, wherein grouping the systems for the customer in the grouping table is provided based on customer type.

17. A processing system comprising:

a processor;

a network interface to a service bus in communication with a population of computer systems supporting a software service;

a memory storing executable instructions which, when executed by the processor, cause the processor, alone or in combination with other processors, to:

identify the systems of the software service that are in scope for receiving the software updates;

determine a respective level of usage for each of the systems;

place the systems of the software service into a plurality of stages of an update to the software service based on the level of usage and based on a grouping table identifying groups of the systems to be placed in a same stage, the placing of the systems including determining a first placement of the systems into a first stage based on the level of usage of the systems and a desired size of the first stage, and in response to a determination that a first group of the systems in the grouping table will be split between the first stage and subsequent stages, determining a second placement by altering the first placement by removing the systems of the first group from the first stage and placing the systems of first group into a second stage subsequent to the first stage; and applying the update to the software service based on the second placement, including applying the update to systems placed in the first stage of the second placement, and after applying the update to systems in the first stage of the second placement, applying the update to the systems in the second stage subsequent to the first stage in the second placement.

\* \* \* \* \*